(12) United States Patent
Narita

(10) Patent No.: US 10,934,848 B2
(45) Date of Patent: Mar. 2, 2021

(54) FAN BLADE AND METHOD FOR DETERMINING SHAPE OF FAN BLADE

(71) Applicant: HONDA MOTOR CO., LTD., Tokyo (JP)

(72) Inventor: Yu Narita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 73 days.

(21) Appl. No.: 16/262,350

(22) Filed: Jan. 30, 2019

(65) Prior Publication Data
US 2019/0234217 A1 Aug. 1, 2019

(30) Foreign Application Priority Data
Feb. 1, 2018 (JP) .................. JP2018-16781

(51) Int. Cl.
*F01D 5/14* (2006.01)
(52) U.S. Cl.
CPC .......... *F01D 5/141* (2013.01); *F05D 2220/32* (2013.01); *F05D 2240/24* (2013.01); *F05D 2250/71* (2013.01)
(58) Field of Classification Search
CPC .................. F01D 5/141; F01D 5/148
See application file for complete search history.

(56) References Cited

U.S. PATENT DOCUMENTS

| | | | | |
|---|---|---|---|---|
| 4,012,172 A * | 3/1977 | Schwaar | ................. | F01D 5/141 416/228 |
| 5,088,892 A * | 2/1992 | Weingold | ................ | F01D 5/145 415/193 |
| 5,167,489 A * | 12/1992 | Wadia | ..................... | B64C 11/18 415/182.1 |
| 5,332,362 A * | 7/1994 | Toulmay | ............... | B64C 27/463 416/223 R |
| 5,480,284 A * | 1/1996 | Wadia | ................... | F04D 29/682 416/91 |
| 6,071,077 A * | 6/2000 | Rowlands | ............... | F01D 5/141 416/223 A |
| 6,331,100 B1 * | 12/2001 | Liu | ....................... | F04D 29/324 416/238 |

(Continued)

FOREIGN PATENT DOCUMENTS

| | | | | |
|---|---|---|---|---|
| CA | 2327850 C | * | 9/2007 | ........... F04D 29/324 |
| EP | 2594805 | | 5/2013 | |

(Continued)

*Primary Examiner* — Ninh H. Nguyen
*Assistant Examiner* — Brian Christopher Delrue
(74) *Attorney, Agent, or Firm* — Rankin, Hill & Clark LLP

(57) ABSTRACT

In a fan blade of a turbofan engine and a method for determining a shape of the fan blade, a shape from a blade root of the fan blade up to a predetermined position in a span direction of the fan blade is same as a shape from a blade root of an original fan blade up to a predetermined position in a span direction of the original fan blade, and a shape from the predetermined position in the span direction of the fan blade up to a blade tip thereof is a shape formed by rotating, only by a predetermined angle in a direction opposite to a direction of rotation of the fan blade with a rotating shaft as a center, each of blade elements present from the predetermined position in the span direction of the original fan blade up to a blade tip thereof.

4 Claims, 10 Drawing Sheets

(56) References Cited

U.S. PATENT DOCUMENTS

| | | | | |
|---|---|---|---|---|
| 6,899,526 B2* | 5/2005 | Doloresco | F01D 5/141 | 416/223 A |
| 6,976,829 B2* | 12/2005 | Kovalsky | B64C 27/46 | 416/226 |
| 7,246,998 B2* | 7/2007 | Kovalsky | B64C 27/463 | 416/87 |
| 7,252,479 B2* | 8/2007 | Bagai | B64C 27/10 | 416/223 R |
| 7,967,571 B2* | 6/2011 | Wood | F01D 5/141 | 416/243 |
| 8,464,426 B2* | 6/2013 | Kirchner | F04D 29/324 | 29/889.71 |
| 8,684,698 B2* | 4/2014 | Breeze-Stringfellow | F04D 29/324 | 416/243 |
| 9,353,628 B2* | 5/2016 | Gallagher | F01D 5/14 | |
| 9,605,542 B2* | 3/2017 | Gallagher | F04D 29/324 | |
| 9,765,795 B2* | 9/2017 | Duong | F01D 5/141 | |
| 9,816,521 B2* | 11/2017 | Kumon | F04D 29/681 | |
| 10,018,050 B2* | 7/2018 | Perrot | F01D 5/141 | |
| 10,036,257 B2* | 7/2018 | Gallagher | F02C 3/14 | |
| 10,221,859 B2* | 3/2019 | Moeckel | F01D 5/141 | |
| 10,330,111 B2* | 6/2019 | Billings | F01D 5/141 | |
| 10,443,390 B2* | 10/2019 | Duong | F01D 5/145 | |
| 10,590,775 B2* | 3/2020 | Gallagher | F01D 5/148 | |
| 2003/0035723 A1* | 2/2003 | Decker | F01D 5/141 | 415/211.2 |
| 2005/0031454 A1* | 2/2005 | Doloresco | F01D 5/141 | 416/238 |
| 2007/0243064 A1* | 10/2007 | Nakano | F04D 29/384 | 416/63 |
| 2012/0243983 A1* | 9/2012 | Breeze-Stringfellow | F01D 5/141 | 415/208.2 |
| 2012/0244005 A1* | 9/2012 | Breeze-Stringfellow | F04D 29/324 | 416/223 A |
| 2015/0071786 A1* | 3/2015 | Kumon | F04D 29/384 | 416/223 R |
| 2015/0125307 A1* | 5/2015 | Kumon | F04D 29/384 | 416/223 R |
| 2017/0175760 A1* | 6/2017 | Gallagher | F04D 19/02 | |

FOREIGN PATENT DOCUMENTS

| | | | | |
|---|---|---|---|---|
| JP | 4974096 B2 * | 7/2012 | F04D 29/321 |
| JP | 4975945 B2 * | 7/2012 | F02C 3/067 |
| JP | 5019721 B2 * | 9/2012 | F02C 3/064 |

* cited by examiner

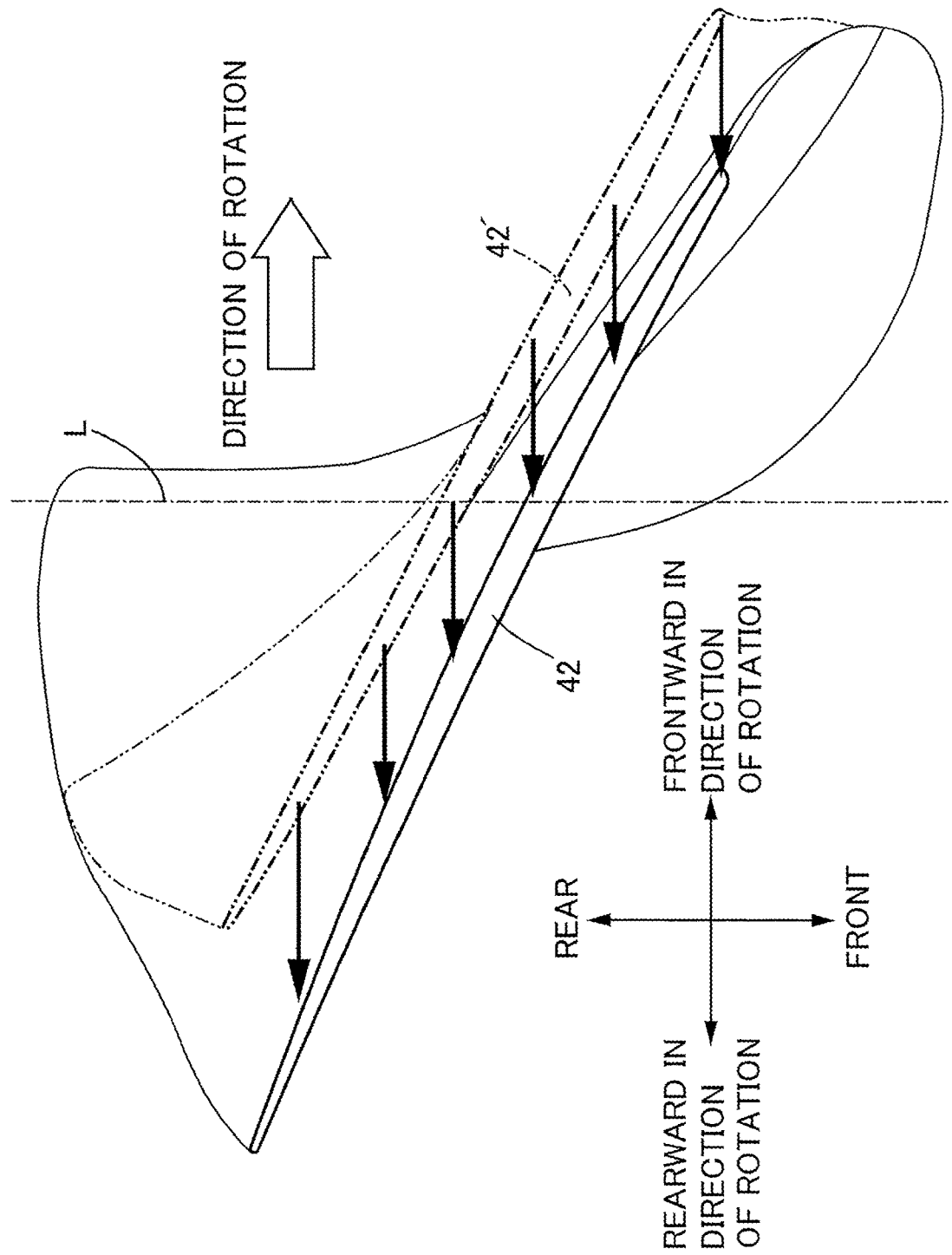

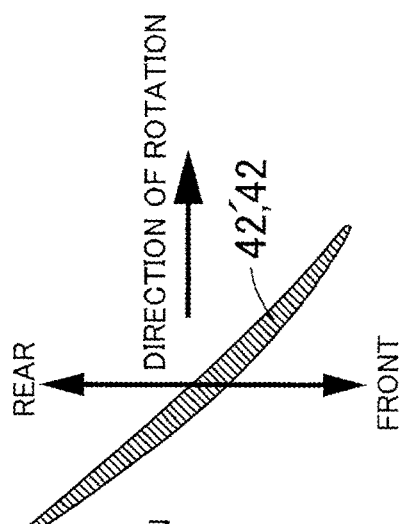
FIG.5A [50%]
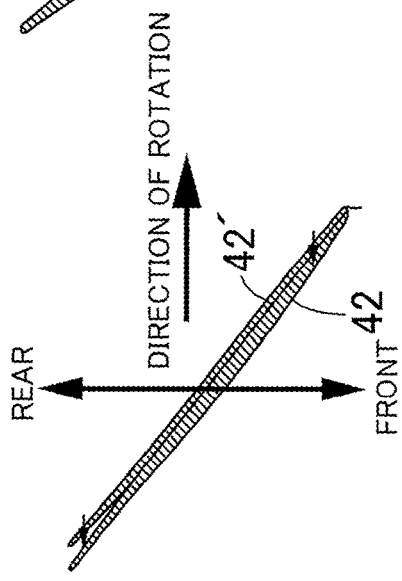
FIG.5B [60%]
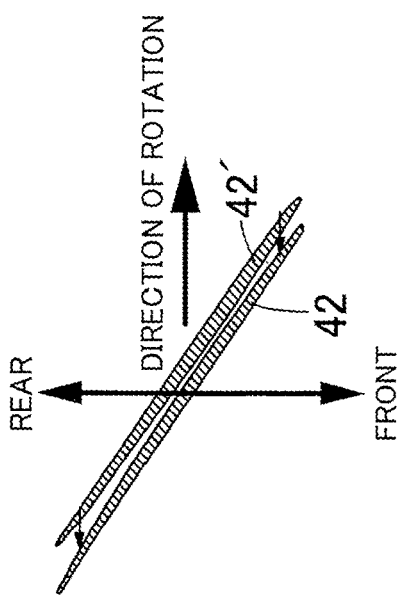
FIG.5C [70%]
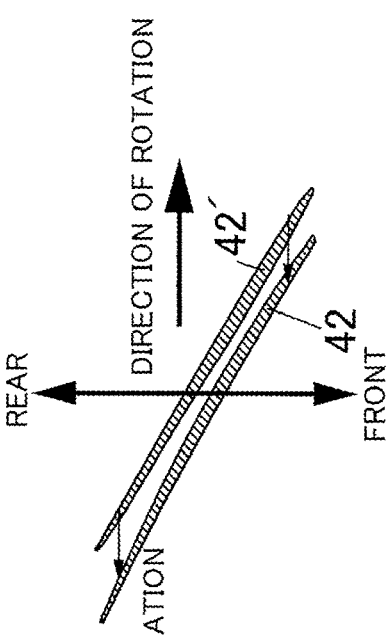
FIG.5D [80%]
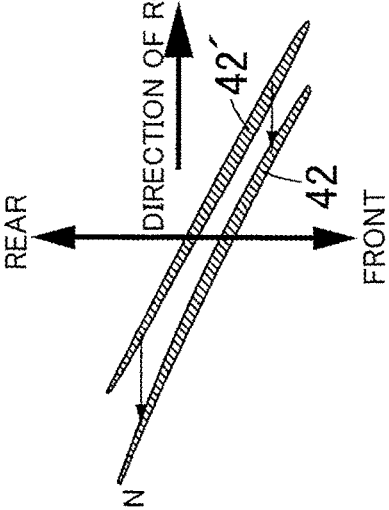
FIG.5E [90%]
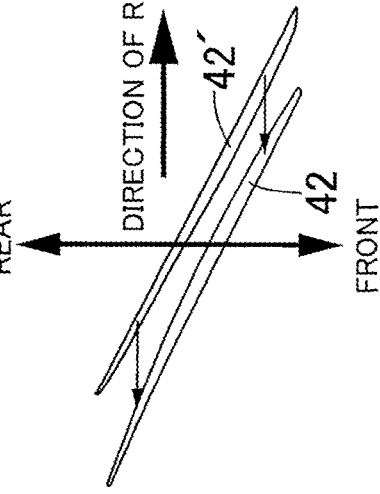
FIG.5F [100%]

FAN BLADE AND METHOD FOR DETERMINING SHAPE OF FAN BLADE

CROSS REFERENCE TO RELATED APPLICATIONS

The present application claims priority under 35 U.S.C. § 119 to Japanese Patent Application No. 2018-16781 filed Feb. 1, 2018 the entire contents of which are hereby incorporated by reference.

BACKGROUND OF THE INVENTION

Field of the Invention

The present invention relates to a fan blade to be used in a plurality in a radial arrangement around a rotating shaft of a turbofan engine, and a method for determining a shape of the fan blade.

Description of the Related Art

A front fan is provided at the front end of a rotating shaft of a turbofan engine, part of the air sucked in by means of the front fan is supplied to a compressor, and the rest is supplied to a bypass passage. If such a turbofan engine sucks in foreign matter such as a bird or a lump of ice and a fan blade is damaged due to collision with the foreign matter, there are the problems that the engine thrust is degraded and vibration occurs.

An arrangement in which a metal sheath is mounted along a leading edge part of a fan blade made of a fiber-reinforced resin to thus reinforce the fan blade and prevent damage due to collision with foreign matter is known from Japanese Patent No. 5573951.

However, the above arrangement has the problem that, since it is necessary to reinforce the fan blade by attaching to it the sheath, which is a separate member, the number of components and the number of assembly steps increase, thus causing an increase in weight or an increase in cost.

SUMMARY OF THE INVENTION

The present invention has been accomplished in light of the above circumstances, and it is an object thereof to prevent, with a simple structure, a fan blade of a turbofan engine from being damaged by collision with foreign matter.

In order to achieve the object, according to a first aspect of the present invention, there is provided a fan blade to be used in a plurality in a radial arrangement around a rotating shaft of a turbofan engine, wherein when an original fan blade is defined to have a predetermined shape, a shape from a blade root of the fan blade up to a predetermined position in a span direction of the fan blade is same as a shape from a blade root of the original fan blade up to a predetermined position in a span direction of the original fan blade, and a shape from the predetermined position in the span direction of the fan blade up to a blade tip thereof is a shape formed by rotating, only by a predetermined angle in a direction opposite to a direction of rotation of the fan blade with the rotating shaft as a center, each of blade elements present from the predetermined position in the span direction of the original fan blade up to a blade tip thereof.

In accordance with the first aspect, since the shape from the blade root of the fan blade up to the predetermined position in the span direction is the same as the shape from the blade root of the original fan blade up to the predetermined position in the span direction, and the shape from the predetermined position in the span direction of the fan blade up to the blade tip is a shape formed by rotating, only by a predetermined angle in a direction opposite to the direction of rotation of the fan blade with the rotating shaft as a center, each of blade elements present from the predetermined position in the span direction of the original fan blade up to the blade tip, it is possible, by inclining the leading edge of a portion, on the blade tip side where the peripheral speed is large, of the fan blade in a direction opposite to the direction of rotation, to deflect the impact when foreign matter collides with the fan blade, thereby preventing the fan blade from being damaged. Moreover, since the shape of the blade element of the fan blade is not changed from that of the original fan blade, the effect on the aerodynamic performance is minimized.

According to a second aspect of the present invention, in addition to the first aspect, the predetermined angle gradually increases from zero in going from a blade element at a predetermined position in a span direction toward a blade element of the blade tip.

In accordance with the second aspect, since the predetermined angle increases gradually from zero in going from the blade element at the predetermined position in the span direction toward the blade element of the blade tip, it is possible, by smoothly curving the leading edge of the fan blade in a direction opposite to the direction of rotation, to produce an impact-absorbing effect more effectively.

According to a third aspect of the present invention, in addition to the second aspect, the predetermined angle at the blade tip is 6°.

In accordance with the third aspect, when the predetermined angle at the blade tip is too large, an excessive bending moment acts on the blade root due to centrifugal force acting on the fan blade, and when the predetermined angle at the blade tip is too small, the impact-absorbing effect is degraded; since the predetermined angle at the blade tip is 6°, it is possible to exhibit a necessary impact-absorbing effect while avoiding an excessive bending moment acting on the blade root of the fan blade.

According to a fourth aspect of the present invention, in addition to any one of the first to third aspects, the predetermined position in the span direction is from a 30% span position to a 90% span position.

In accordance with the fourth aspect, when the predetermined position in the span direction is too far on the inner side, an excessive bending moment acts on the blade root due to centrifugal force acting on the fan blade, and when the predetermined position in the span direction is too far on the outer side, the region in which an impact-absorbing effect is exhibited within the rotational speed region for the fan blade becomes small; since the predetermined position in the span direction is from the 30% span position to the 90% span position, it is possible for a necessary impact-absorbing effect to be exhibited while avoiding an excessive bending moment acting on the blade root of the fan blade.

According to a fifth aspect of the present invention, there is provided a method for determining a shape of a fan blade in which the fan blade to be used in a plurality in a radial arrangement around a rotating shaft of a turbofan engine has its shape determined by modifying a shape of an original fan blade, the method comprising determining a shape from a blade root of the fan blade up to a predetermined position in a span direction of the fan blade as being same as a shape from a blade root of the original fan blade up to a predetermined position in a span direction of the original fan blade, and determining a shape from the predetermined position in the span direction of the fan blade up to a blade tip thereof as being a shape formed by rotating, only by a predetermined angle in a direction opposite to a direction of rotation of the fan blade with the rotating shaft as a center, each of blade elements present from the predetermined position in the span direction of the original fan blade up to a blade tip thereof.

In accordance with the fifth aspect, since the shape from the blade root of the fan blade up to the predetermined position in the span direction is the same as the shape from the blade root of the original fan blade up to the predetermined position in the span direction, and the shape from the predetermined position in the span direction of the fan blade up to the blade tip is a shape formed by rotating, only by a predetermined angle in a direction opposite to the direction of rotation of the fan blade with the rotating shaft as a center, each of blade elements present from the predetermined position in the span direction of the original fan blade up to the blade tip, it is possible, by inclining the leading edge of a portion, on the blade tip side where the peripheral speed is large, of the fan blade in a direction opposite to the direction of rotation, to deflect the impact when foreign matter collides with the fan blade, thereby preventing the fan blade from being damaged. Moreover, since the shape of the blade element of the fan blade is not changed from that of the original fan blade, the effect on the aerodynamic performance is minimized.

In accordance with the fifth aspect in particular, since the shape of the blade element of the fan blade is not changed from that of the original fan blade, a design change from the shape of the original fan blade is easy.

Note that a low pressure system shaft 15 of embodiments corresponds to the rotating shaft of the present invention, and a rotational angle θ of the embodiments corresponds to the predetermined angle of the present invention.

The above and other objects, characteristics and advantages of the present invention will be clear from detailed descriptions of the preferred embodiments which will be provided below while referring to the attached drawings.

BRIEF DESCRIPTION OF THE DRAWINGS

FIG. 4 is a view in a direction of arrow 4 in FIG. 3A (first embodiment).

FIGS. 5A to 5F respectively show sectional views from 50% span position to 100% span position in FIGS. 3A and 3B (first embodiment).

DESCRIPTION OF THE PREFERRED EMBODIMENTS

First Embodiment

A first embodiment of the present invention is explained below by reference to FIG. 1 to FIG. 6.

Figure 1:
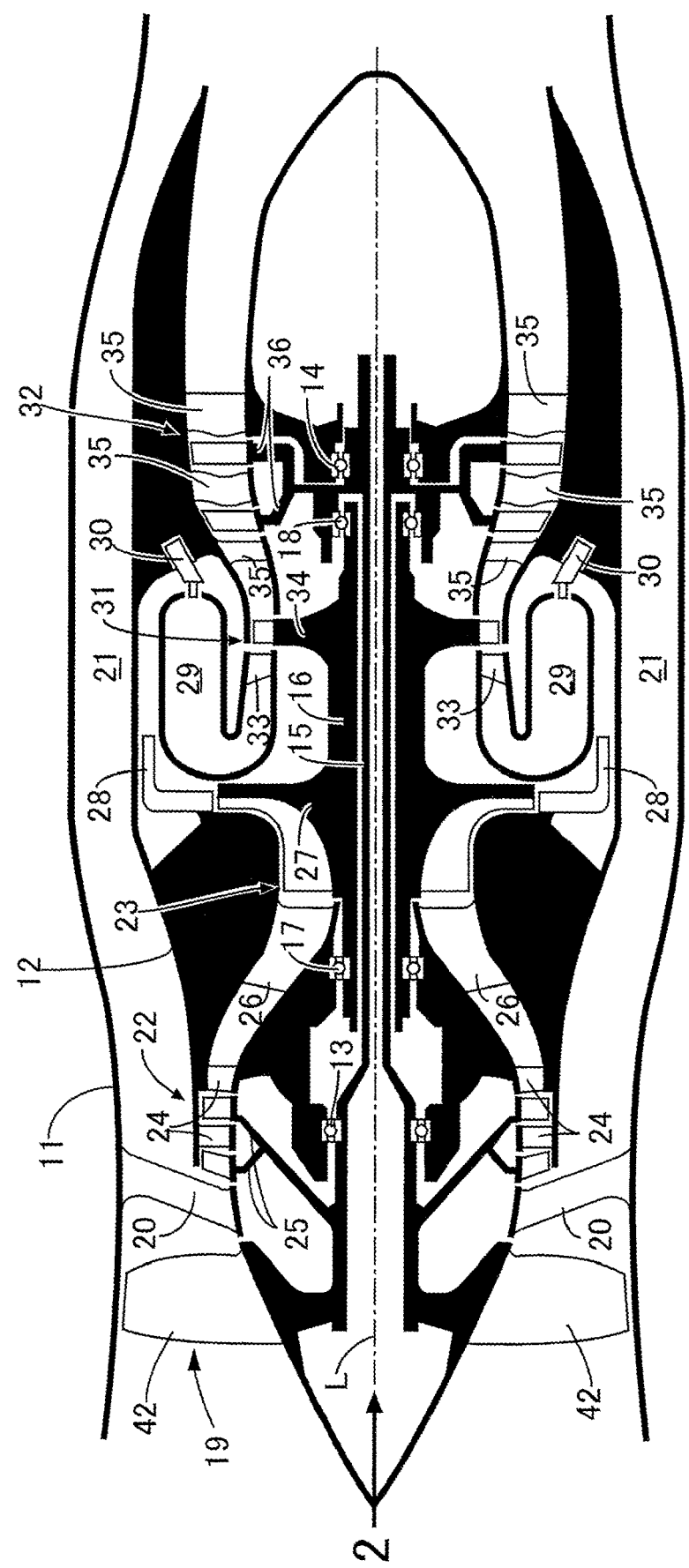
FIG. 1 is a diagram showing the overall structure of a turbofan engine (first embodiment).

As shown in FIG. 1, a turbofan engine for an airplane to which the present invention is applied includes an outer casing 11 and an inner casing 12, and a front part and a rear part of a low pressure system shaft 15 are rotatably supported in the interior of the inner casing 12 via a front first bearing 13 and a rear first bearing 14. A tubular high pressure system shaft 16 is relatively rotatably fitted around the outer periphery of an intermediate part in the axial direction of the low pressure system shaft 15, a front part of the high pressure system shaft 16 is rotatably supported on the inner casing 12 via a front second bearing 17, and a rear part of the high pressure system shaft 16 is relatively rotatably supported on the low pressure system shaft 15 via a rear second bearing 18.

Fixed to the front end of the low pressure system shaft 15 is a front fan 19 having its blade tip facing an inner face of the outer casing 11, and part of the air sucked in by the front fan 19 passes through a stator vane 20 disposed between the outer casing 11 and the inner casing 12; part thereof then passes through an annular bypass duct 21 formed between the outer casing 11 and the inner casing 12 and is jetted rearward, and another part is supplied to an axial low pressure compressor 22 and a centrifugal high pressure compressor 23 disposed in the interior of the inner casing 12.

The low pressure compressor 22 includes a stator vane 24 fixed to the interior of the inner casing 12 and a low pressure compressor wheel 25 equipped with a compressor blade on the outer periphery and fixed to the low pressure system shaft 15. The high pressure compressor 23 includes a stator vane 26 fixed to the interior of the inner casing 12 and a high pressure compressor wheel 27 equipped with a compressor blade on the outer periphery and fixed to the high pressure system shaft 16.

A reverse flow combustion chamber 29 is disposed to the rear of a diffuser 28 connected to the outer periphery of the high pressure compressor wheel 27, and fuel is injected into the interior of the reverse flow combustion chamber 29 from a fuel injection nozzle 30. Fuel and air are mixed and combusted in the interior of the reverse flow combustion chamber 29, and the combustion gas thus generated is supplied to a high pressure turbine 31 and a low pressure turbine 32.

The high pressure turbine 31 includes a nozzle guide vane 33 fixed to the interior of the inner casing 12, and a high pressure turbine wheel 34 equipped with a turbine blade on the outer periphery and fixed to the high pressure system shaft 16. The low pressure turbine 32 includes a nozzle guide vane 35 fixed to the interior of the inner casing 12, and a low pressure turbine wheel 36 equipped with a turbine blade on the outer periphery and fixed to the low pressure system shaft 15.

Therefore, when the high pressure system shaft 16 is driven by a starter motor, which is not illustrated, air sucked in by the high pressure compressor wheel 27 is supplied to the reverse flow combustion chamber 29, mixed with fuel, and combusted, and the combustion gas thus generated drives the high pressure turbine wheel 34 and the low pressure turbine wheel 36. As a result, the low pressure system shaft 15 and the high pressure system shaft 16 rotate, and the front fan 19, the low pressure compressor wheel 25, and the high pressure compressor wheel 27 compress air and supply it to the reverse flow combustion chamber 29, the operation of the gas turbine engine thus continuing even when the starter motor is stopped.

While the gas turbine engine is operating, part of the air sucked in by the front fan 19 passes through the bypass duct 21 and is jetted rearward, thus generating the main thrust at a time of low speed flying in particular. The rest of the air sucked in by the front fan 19 is supplied to the reverse flow combustion chamber 29, mixed with fuel, combusted to thus drive the low pressure system shaft 15 and the high pressure system shaft 16, and then jetted rearward to generate thrust.

Figure 2:
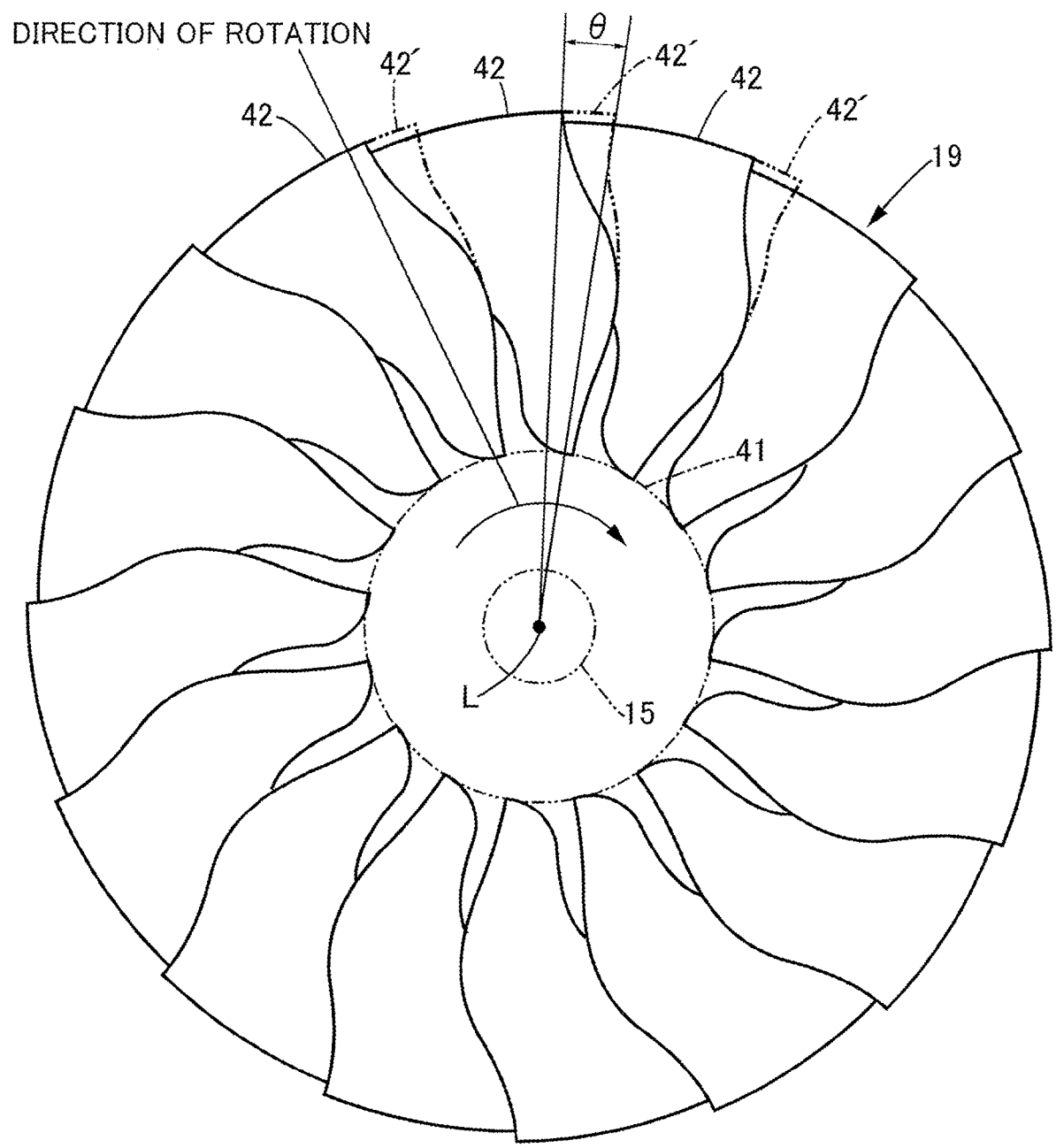
FIG. 2 is a view in a direction of arrow 2 in FIG. 1 (first embodiment).

FIG. 2 shows a state in which the front fan 19 is viewed from the front in an axis L direction of the low pressure system shaft 15, and a plurality of fan blades 42 extend radially outward in the radial direction from a hub 41 provided at the front end of the low pressure system shaft 15. The direction of rotation of the front fan 19 is the clockwise direction in FIG. 2.

Figure 3A:
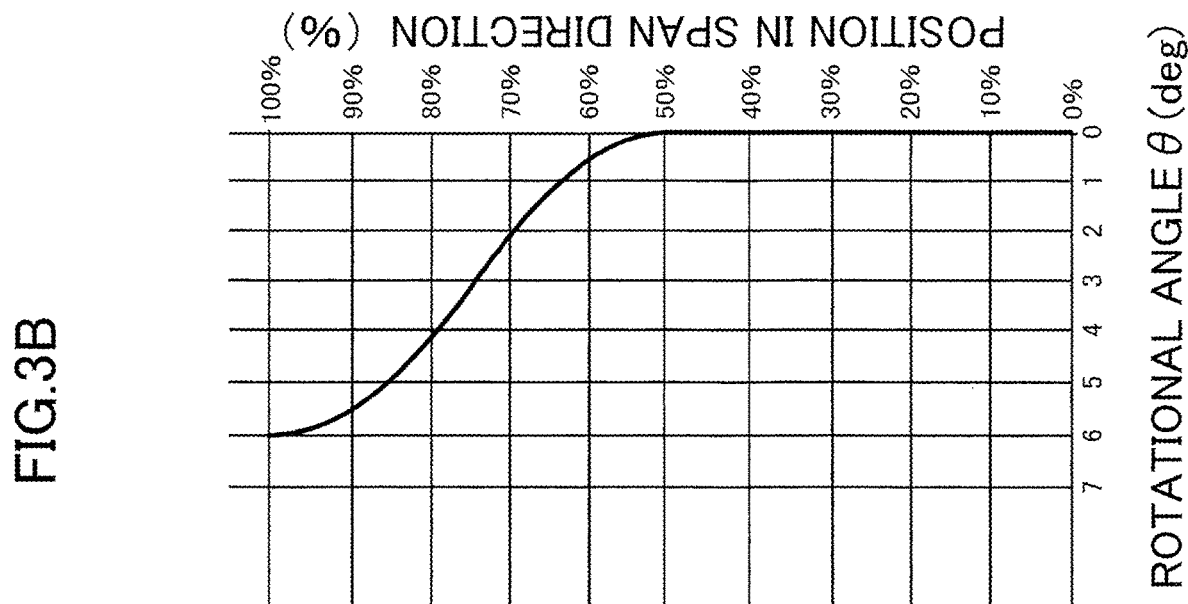
FIG. 3A is a front view of a fan blade and FIG. 3B is a graph showing a relationship between rotational angle and position in a span direction (first embodiment).

FIG. 3A shows a state in which one fan blade 42 is viewed from the front in the axis L direction, and FIG. 4 is a view from the direction of arrow 4 in FIG. 3A (view in which the fan blade 42 is viewed looking inward in the radial direction).

The fan blade 42 twists so that, while the chord length gradually increases in going from a blade root 43 toward a blade tip 44, the angle of attack gradually decreases from the blade root 43 toward the blade tip 44. The chain line shows an original fan blade 42' that is the basis of the fan blade 42 of the present embodiment, and the shape of the fan blade 42 shown by the solid line is determined by partially modifying the shape of the original fan blade 42'.

The positions of the fan blade 42 and the original fan blade 42' in the span direction are expressed with the position of the blade root 43 as the 0% span position and the position of the blade tip 44 as the 100% span position. In the present embodiment, the fan blade 42 and the original fan blade 42' have the same shape in a range from the 0% span position to the 50% span position, and the fan blade 42 is inclined in a direction opposite to the direction of rotation with respect to the original fan blade 42' in a range from the 50% span position to the 100% span position.

FIG. 5A shows blade elements (blade cross-sectional shapes) at the 50% span position; the blade elements of the two overlap each other at this position. FIG. 5F shows blade elements at the 100% span position (blade tip 44 position), and the blade element of the fan blade 42 corresponds to that obtained by rotating the blade element of the original fan blade 42' in a direction opposite to the direction of rotation of the front fan 19 only by a rotational angle θ of 6°. The rotational angle θ is an angle measured with the axis L of the low pressure system shaft 15, which is the rotational axis of the front fan 19, as a center.

Figure 3B:
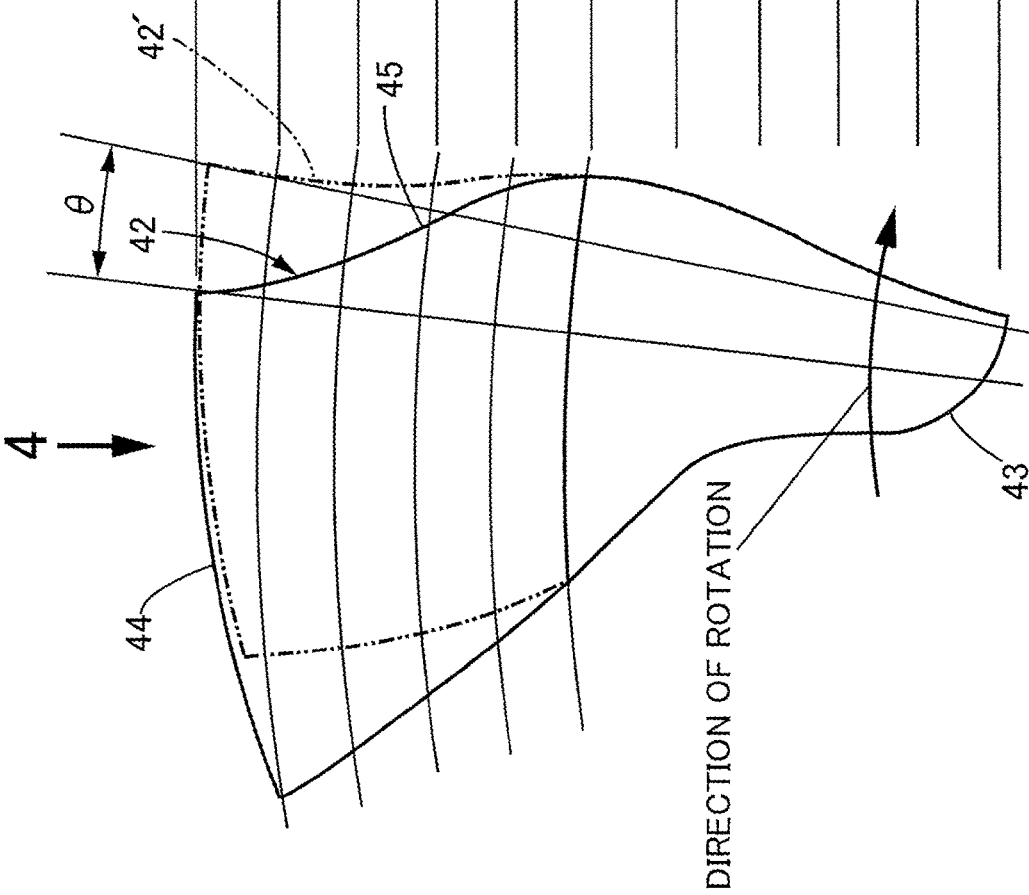

The graph of FIG. 3B is a graph showing the relationship between rotational angle θ and position in the span direction; since the rotational angle θ is 0° from the 0% span position to the 50% span position, the fan blade 42 and the original fan blade 42' have the same shape. From the 50% span position to the 100% span position, the rotational angle θ gradually increases from θ=0° to θ=6°. The manner in which the rotational angle θ increases is the same shape as a half cycle of a sine curve, and in response to the position of the fan blade 42 in the span direction moving to the blade tip 44 side, the rotational angle θ first increases gently, then increases rapidly, and finally increases gently.

FIG. 5B to FIG. 5E show blade elements from the 60% span position to the 90% span position of the fan blade 42 and the original fan blade 42', and it can be seen that in going from the blade root 43 side to the blade tip 44 side, the rotational angle θ gradually increases, and the amount of displacement of the fan blade 42 with respect to the original fan blade 42' increases. The important point here is that the position of the blade element in the span direction changes only in the peripheral direction but not in the axial direction.

With regard to the fan blade 42 having the above shape, since the shape of a portion on the radially outer side of the leading edge 45, where the peripheral speed is large, is inclined further to the rear in the direction of rotation (a direction opposite to the direction of rotation) compared with the original fan blade 42', when a bird or a lump of ice is sucked into the interior of the turbofan engine and collides with the leading edge 45 of the fan blade 42, the foreign matter is released to the rear in the direction of rotation by means of the inclined leading edge 45, thereby minimizing any damage to the fan blade 42.

Figure 6:
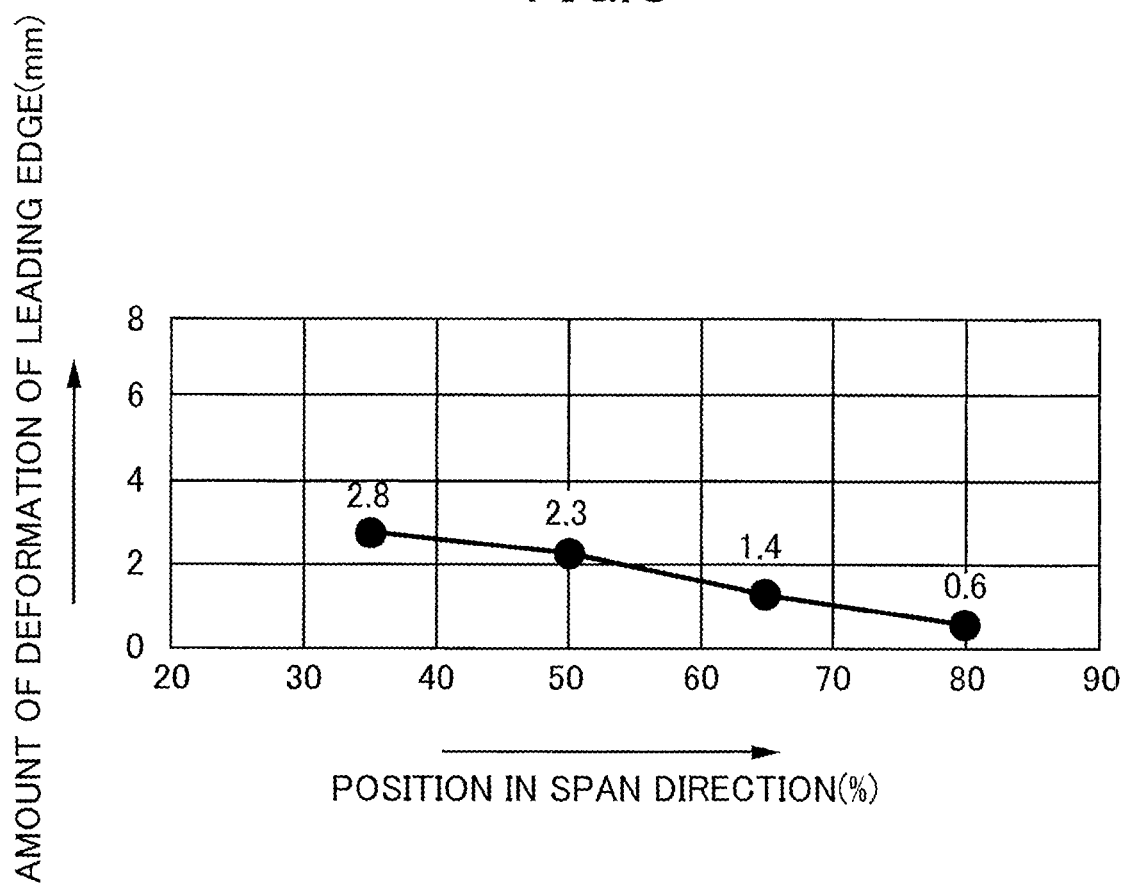
FIG. 6 is a graph showing an amount of deformation of a leading edge due to collision with foreign matter (first embodiment).
Figure 7A:
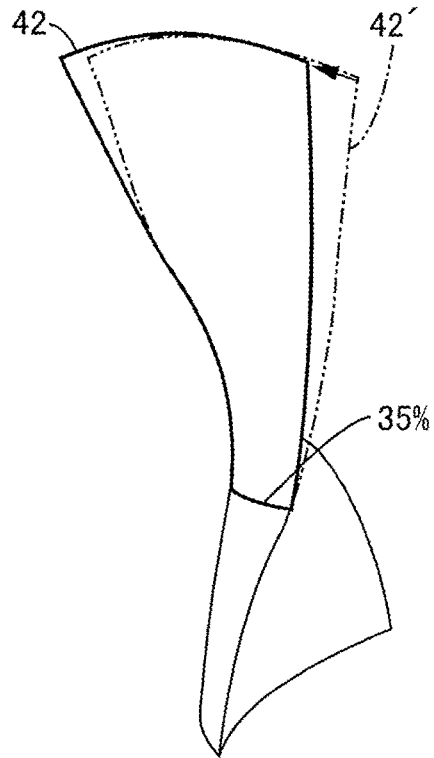
FIGS. 7A to 7D are perspective views of a fan blade (second embodiment).
Figure 7B:
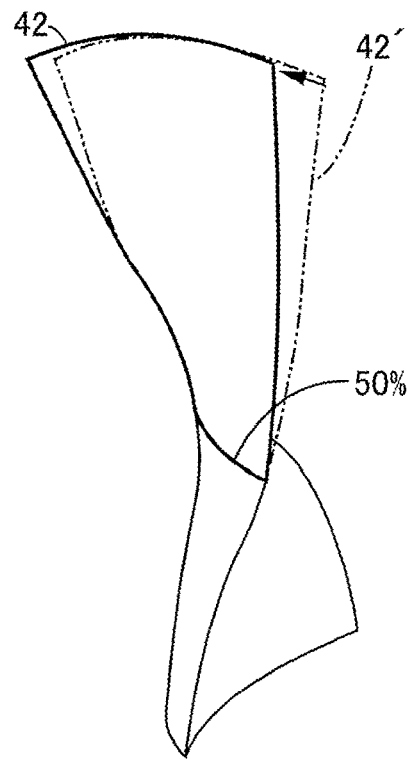
Figure 7C:
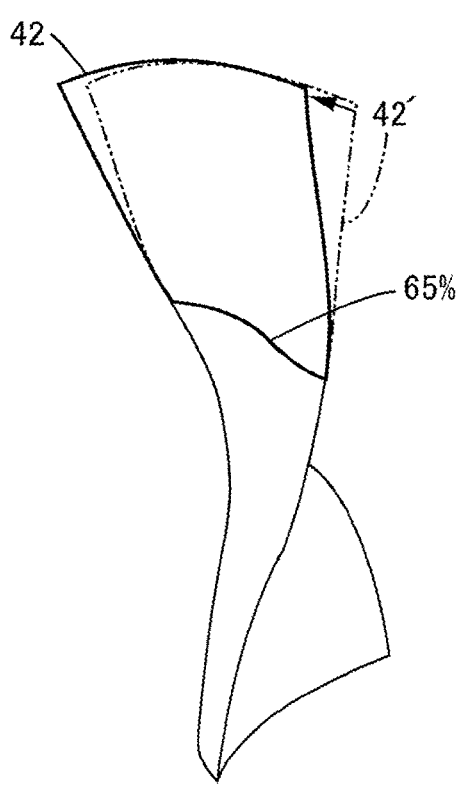
Figure 7D:
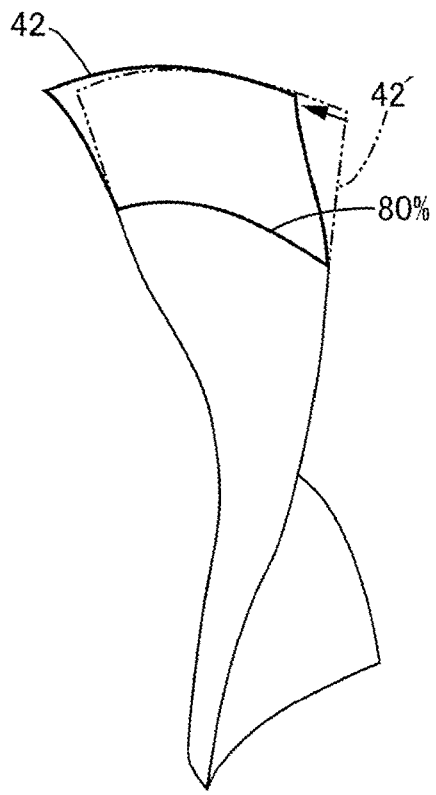

FIG. 6 shows the amount of deformation of the leading edge 45 when foreign matter collides with the fan blade 42 having the above shape (when the rotational angle θ at the blade tip is 6°). The amount of deformation gradually decreases from 2.8 mm at the 35% span position to 0.6 mm at the 80% span position, and it can be seen that the amount of deformation is suppressed so that it is very small at any position.

Since the fan blade 42 of the present embodiment can be obtained by merely slightly modifying the design of the existing original fan blade 42', that is, by merely rotating each of the blade elements from the 50% span position to the 100% span position to the rear in the direction of rotation only by the rotational angle θ shown in FIG. 3B, designing the fan blade 42 is easy. Furthermore, since the shape from the 0% span position to the 50% span position is the same as that of the original fan blade 42', and the shape from the 50% span position to the 100% span position is that obtained by merely rotating the original fan blade 42' in the peripheral direction, any degradation in the aerodynamic performance of the original fan blade 42' can be minimized. Moreover, since the rotational angle θ gradually increases from 0° to 6°, the leading edge 45 of the fan blade 42 is smoothly curved in a direction opposite to the direction of rotation, thereby enabling an impact-absorbing effect to be produced more effectively.

Second Embodiment

A second embodiment of the present invention is now explained by reference to FIG. 7A to FIG. 10.

With regard to the fan blade 42 of the first embodiment, the blade elements in a range from the 50% span position to the 100% span position are moved to the rear in the direction of rotation, but the starting point of the movement of the blade element of the fan blade 42 can be freely changed as shown in FIG. 7A to FIG. 7D such as being at the 35% span position, the 50% span position, the 65% span position, or the 80% span position. Furthermore, in the first embodiment, the rotational angle θ is 6° at the position of the blade tip 44 of the fan blade 42 (100% span position), but the rotational angle at the position of the blade tip 44 of the fan blade 42 can be set at 3°.

Figure 8:
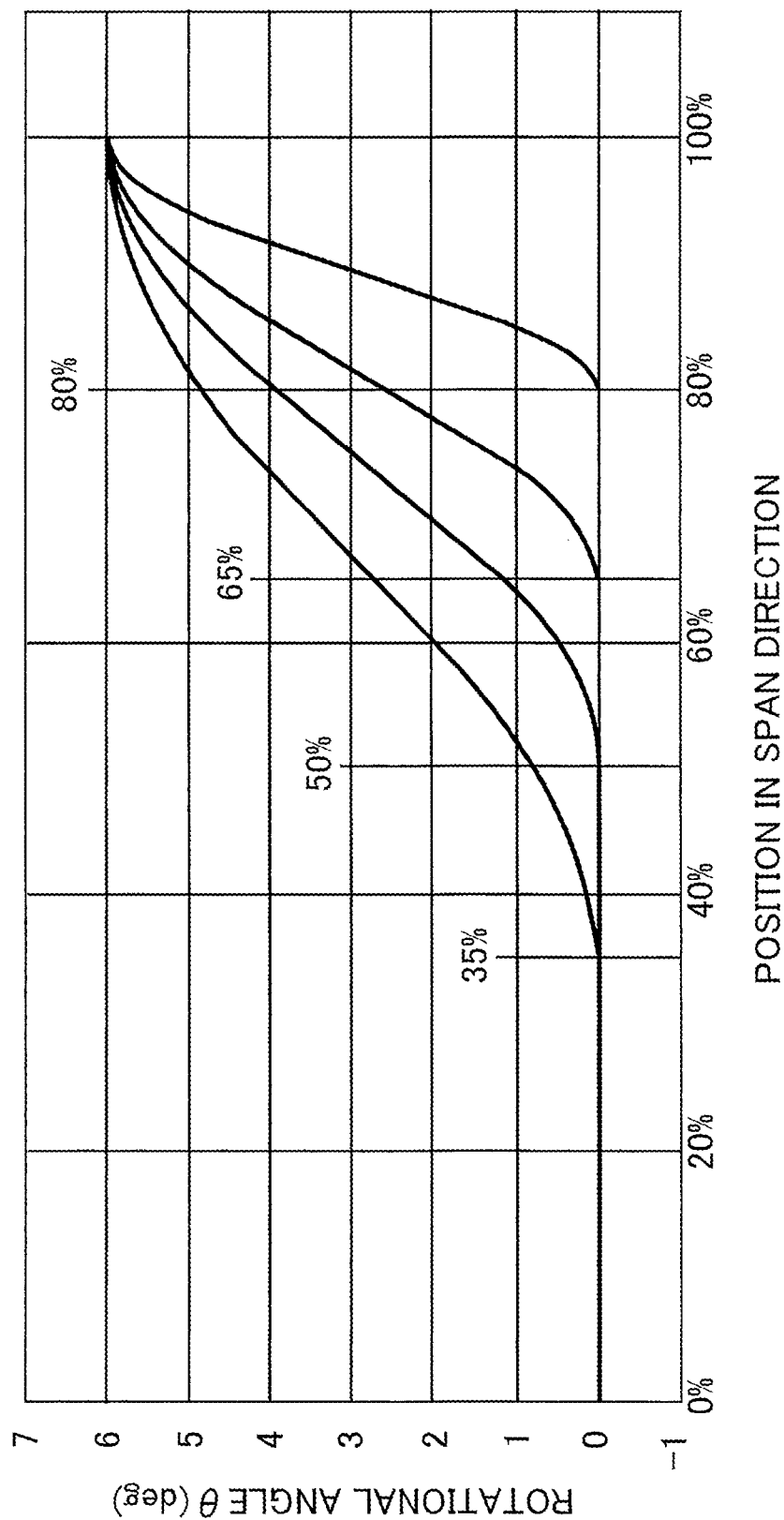
FIG. 8 is a graph showing a relationship between position in a span direction of the fan blade and rotational angle (second embodiment).

FIG. 8 is a graph having the position of the fan blade 42 in the span direction as the abscissa and having the rotational angle θ of the blade element as the ordinate. Even when the position in the span direction at which the rotation of the fan blade 42 starts changes between 35%, 50%, 65%, and 80%, the manner in which the rotational angle θ increases from each position in the span direction toward the blade tip 44 side is the same shape as a half cycle of a sine curve, and the rotational angle θ increases gently in response to the position of the fan blade 42 in the span direction moving toward the blade tip 44.

Figure 9:
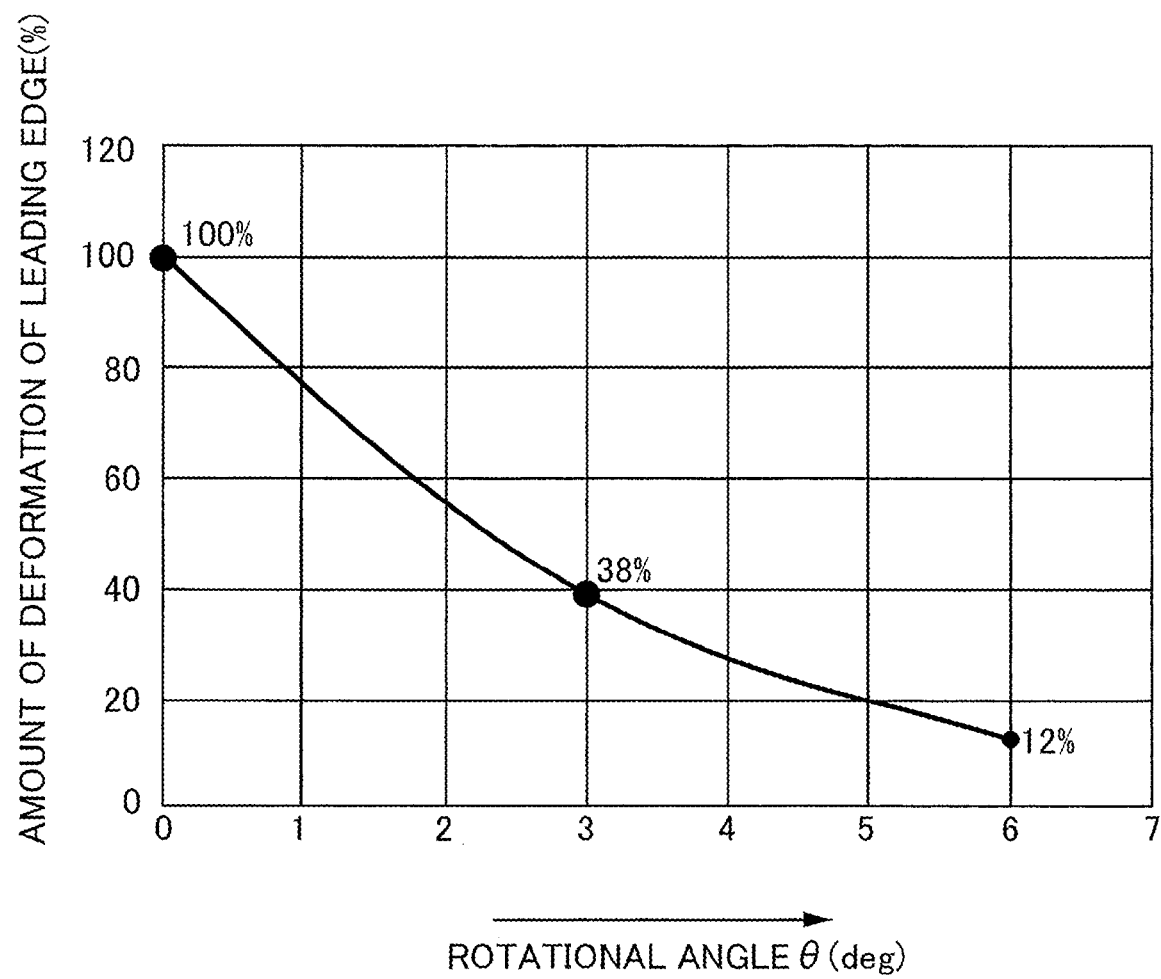
FIG. 9 is a graph showing a relationship between rotational angle at a blade tip position and amount of deformation of a leading edge (second embodiment).

FIG. 9 shows a blade shape that starts changing at the 50% span position, the rotational angle θ at the position of the blade tip 44 of the fan blade 42 being the abscissa, and the amount of deformation of the leading edge 45 of the fan blade 42 due to collision with foreign matter being the ordinate. When the amount of deformation when the rotational angle θ at the position of the blade tip 44 of the fan blade 42 is 0°, that is, the amount of deformation of the original fan blade 42', is 100% the amount of deformation gradually decreases in response to the rotational angle θ increasing from 0°; when the rotational angle θ is 3° the amount of deformation decreases to 38% of that of the original fan blade 42', when the rotational angle θ is 6° the amount of deformation decreases to 12% of that of the original fan blade 42', and it can be seen that the larger the rotational angle θ at the position of the blade tip 44, the higher the deformation prevention effect.

However, when the rotational angle θ at the position of the blade tip 44 is large, the fan blade 42 attains a strongly bent dog-leg shape when viewed from the front, and there is the problem that a large bending moment acts on a portion on the blade root 43 side due to a centrifugal force acting on a portion on the blade tip 44 side where the peripheral speed is large, the optimum value for the rotational angle θ at the position of the blade tip 44 therefore being 6°.

Figure 10:
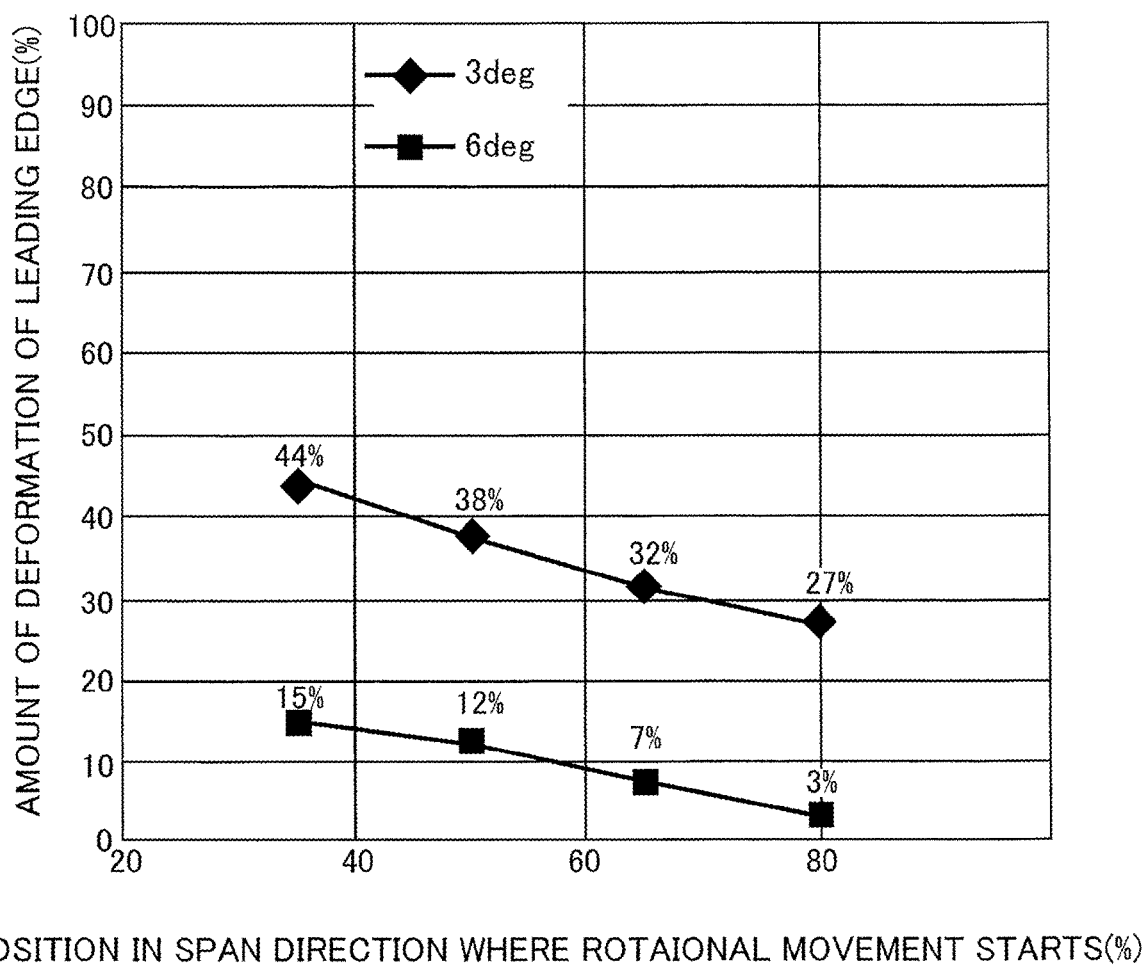
FIG. 10 is a graph showing a relationship between position in the span direction where rotational movement starts and amount of deformation of the leading edge (second embodiment).

As shown in FIG. 10, it can be seen that, regardless of the magnitude of the rotational angle θ at the position of the blade tip 44, when the position in the span direction where rotation of the fan blade 42 is started moves toward the blade tip 44 side, the deformation prevention effect is enhanced. However, if the position in the span direction where rotation of the fan blade 42 is started is too close to the position of the blade tip 44, since the probability of foreign matter colliding with a portion where the leading edge 45 is moved back decreases, the deformation prevention effect is rather degraded. The position in the span direction where rotation of the fan blade 42 is started is desirably the 90% position or lower, and can be considered to be most suitably the 80% position.

Embodiments of the present invention are explained above, but the present invention may be modified in a variety of ways as long as the modifications do not depart from the gist of the present invention.

For example, the technical scope of the present invention is not limited to a front fan of a turbofan engine and may be applied to a blade of a blower, a compressor, etc. or a blade of a pump.

What is claimed is:

1. A fan blade to be used in a plurality in a radial arrangement around a rotating shaft of a turbofan engine, wherein the fan blade comprises:
   a blade root;
   a blade tip opposite to the blade root in a span direction of the fan blade;
   a first fan blade portion extending from the blade root to a predetermined position in the span direction of the fan blade; and
   a second fan blade portion extending in the span direction of the fan blade from the predetermined position in the span direction of the fan blade to the blade tip,
   wherein
   the predetermined position in the span direction of the fan blade is a 50% span position from the blade root,
   the fan blade is formed by bending an original fan blade so that, when the original fan blade is defined to have a predetermined shape,
   a shape of the first fan blade portion is same as a shape from a blade root of the original fan blade to a predetermined position in a span direction of the original fan blade, the predetermined position in the span direction of the original fan blade corresponding to the predetermined position in the span direction of the fan blade, and
   a shape of the second fan blade portion is a shape formed by rotating, only by a predetermined angle in a direction opposite to a direction of rotation of the fan blade with the rotating shaft as a center, the original fan blade from the predetermined position in the span direction of the original fan blade up to a blade tip of the original fan blade.

2. The fan blade according to claim 1, wherein the predetermined angle gradually increases from zero from the predetermined position in the span direction toward the blade tip.

3. The fan blade according to claim 2, wherein the predetermined angle at the blade tip relative to the blade tip of the original fan blade about a rotational axis of the rotating shaft is 6°.

4. A method for determining a shape of a fan blade in which the fan blade is to be used in a plurality in a radial arrangement around a rotating shaft of a turbofan engine and has its shape determined by modifying a shape of an original fan blade, the method comprising
   determining a shape of a first fan blade portion from a blade root of the fan blade up to a predetermined position in a span direction of the fan blade as being same as a shape from a blade root of the original fan blade up to a predetermined position in a span direction of the original fan blade, wherein the predetermined position in the span direction of the original fan blade corresponds to the predetermined position in the span direction of the fan blade, and
   determining a shape of a second fan blade portion from the predetermined position in the span direction of the fan blade to a blade tip of the fan blade as being a shape formed by rotating, only by a predetermined angle in a direction opposite to a direction of rotation of the fan blade with the rotating shaft as a center, the original fan blade from the predetermined position in the span direction of the original fan blade up to a blade tip of the original fan blade,
   wherein the predetermined position in the span direction of the fan blade is a 50% span position from the blade root.

* * * * *